(12) United States Patent
Waddington et al.

(10) Patent No.: US 12,131,030 B2
(45) Date of Patent: Oct. 29, 2024

(54) OPTIMIZING MEMORY MANAGEMENT USING MEMORY ACCESS HEATMAPS

(71) Applicant: International Business Machines Corporation, Armonk, NY (US)

(72) Inventors: Daniel Waddington, Morgan Hill, CA (US); Saransh Gupta, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/173,229

(22) Filed: Feb. 23, 2023

(65) Prior Publication Data

US 2024/0289021 A1    Aug. 29, 2024

(51) Int. Cl.
*G06F 3/06* (2006.01)

(52) U.S. Cl.
CPC .......... *G06F 3/0613* (2013.01); *G06F 3/0653* (2013.01); *G06F 3/0685* (2013.01)

(58) Field of Classification Search
CPC ..... G06F 3/0613; G06F 3/0653; G06F 3/0685
USPC ....................................................... 711/117
See application file for complete search history.

(56) References Cited

U.S. PATENT DOCUMENTS

| | | | |
|---|---|---|---|
| 9,411,742 B2 | 8/2016 | Benhase et al. | |
| 9,413,527 B2 | 8/2016 | Yang et al. | |
| 9,652,405 B1 | 5/2017 | Shain et al. | |
| 9,697,091 B2 | 7/2017 | Gordon et al. | |
| 10,509,723 B1 | 12/2019 | Szczepanik et al. | |
| 10,528,520 B2 | 1/2020 | Eda et al. | |
| 10,838,933 B2 | 11/2020 | Marwah et al. | |
| 11,073,999 B2 | 7/2021 | Karve et al. | |
| 2016/0239222 A1* | 8/2016 | Shetty | G06F 3/0685 |
| 2017/0060764 A1* | 3/2017 | Shetty | G06F 12/126 |
| 2018/0136838 A1* | 5/2018 | White | G06F 3/0647 |
| 2019/0356730 A1 | 11/2019 | Bivens et al. | |

(Continued)

FOREIGN PATENT DOCUMENTS

DE    112014000254 T5    10/2015

OTHER PUBLICATIONS

David Boles et al., "CXL-Enabled Enhanced Memory Functions," IEEE Micro, IEEE Computer Society, Year: 2022, pp. 1-8.

(Continued)

*Primary Examiner* — Than Nguyen
(74) *Attorney, Agent, or Firm* — Patterson + Sheridan, LLP (57) ABSTRACT

Embodiments of the present disclosure provide an enhanced system and methods for optimizing data placement in a memory hierarchy. A disclosed non-limiting computer-implemented method configures a counter block comprising access frequency counters mapped into an application memory space, and configures a counter map, where each entry in the counter map associates an application-defined memory region with the access frequency counters of the counter block. A memory controller identifies a memory access in a given application-defined memory region and compares an access address with a mask in the counter map to track the memory access. The memory controller generates a heatmap representing a frequency count of accesses to quantized memory using the access frequency counters. Generating the heatmap is performed by memory controller hardware.

20 Claims, 8 Drawing Sheets

(56) References Cited

U.S. PATENT DOCUMENTS

| | | | |
|---|---|---|---|
| 2023/0107660 A1* | 4/2023 | Rushing | G06F 12/0871 711/118 |
| 2023/0305738 A1* | 9/2023 | Bi | G06F 3/0659 |
| 2023/0394012 A1* | 12/2023 | Marwah | G06F 16/217 |

OTHER PUBLICATIONS

Patil et al., "Symbiotic HW Cache and SW DTLB Prefetching for DRAM/NVM Hybrid Memory" in the International Symposium on Modeling, Analysis and Simulation of Computer and Telecommunication Systems (MASCOTS), 2020.

Hasan Al Maruf et al., "TPP: Transparent p. Placement for CXL-Enabled Tiered Memory," arXiv, Dated: Jun. 6, 2022, pp. 1-16.

Ren, Jie, et al. "Optimizing large-scale plasma simulations on persistent memory-based heterogeneous memory with effective data placement across memory hierarchy." Proceedings of the ACM International Conference on Supercomputing. 2021.

Chen, Guoyang, et al. "Optimizing data placement on GPU memory: A portable approach." IEEE Transactions on Computers 66.3 (2016): 473-487.

Zhang, Lei, et al. "Optimal data placement for heterogeneous cache, memory, and storage systems." Proceedings of the ACM on Measurement and Analysis of Computing Systems 4.1 (2020): 1-27.

Authors et al., "Cache Memory Management," ip.com, IP.com No. IPCOM000240105D, dated Jan. 2, 2015, pp. 1-4.

Authors et al., "Coarse-grained Adaptive Replacement Cache with Fine-grained Access Frequency Tracking," ip.com, IP.com No. IPCOM000267356D, dated Oct. 20, 2021, pp. 1-3.

Authors et al., "System and Method for Software Debug using Fast CacheSimulation by Separation of Data and Tag Views," ip.com, IP.com No. IPCOM000267673D, Dated: Nov. 15, 2021, pp. 1-18.

\* cited by examiner

OPTIMIZING MEMORY MANAGEMENT USING MEMORY ACCESS HEATMAPS

BACKGROUND

The present invention relates to memory management, and more specifically, to memory controller hardware for optimizing data placement in a memory hierarchy by collecting data access frequencies in the form of a heatmap.

A computer memory hierarchy starts with an upper layer CPU L1 cache and moves down through L2 and L3 caches into Random Access Memory (RAM) main memory, solid state memory comprising non-volatile flash-based solid state drive (SSD) memory, and then finally into virtual memory comprising file-based memory such as mechanical hard drives. Memory movement between the layers is decided by a defined policy that evicts memory lines (typically 64B) based on variations of an LRU (Least Recently Used) policy. Movement of data from main memory (e.g., DRAM) is typically governed through both a cache policy (e.g., kernel block cache) and explicit requests from the application (e.g., file system flush).

SUMMARY

Embodiments of the present disclosure provide an enhanced system and methods for optimizing data placement in a memory hierarchy.

A disclosed non-limiting computer-implemented method configures a counter block comprising access frequency counters mapped into an application memory space, and configures a counter map, where each entry in the counter map associates an application-defined memory region with the access frequency counters of the counter block. A memory controller compares an access address in a given application-defined memory region with a mask in the counter map to track the memory access. The memory controller generates a heatmap representing a frequency count of accesses to quantized memory with the access frequency counters. Generating the heatmap is performed by memory controller hardware.

Other disclosed embodiments include a computer system and computer program product for optimizing data placement in a memory hierarchy implementing features of the above-disclosed method.

DETAILED DESCRIPTION

Embodiments of the present disclosure provide a system and methods for optimizing data placement in a memory hierarchy. One disclosed method for optimizing data placement in the cache hierarchy or memory hierarchy comprises a memory controller collecting data access frequencies in the form of a "heatmap", where the heatmap represents a frequency count of accesses to quantized memory and the heatmap capture can be a function of memory controller hardware. Heatmaps of disclosed embodiments enable effective management of memory in the context of heterogeneous memories that have different performance characteristics. For example, the heatmaps advantageously can be used as part of an algorithm that decides how to map local and remote (e.g., Compute eXpress Link (CXL) attached) memories to an application or VM address space. Another example is Cache Coherent Interconnect for Accelerators or CCIX®, which is a chip-to-chip interconnect that enables two or more devices to share data in a cache coherent manner. Open Coherent Accelerator Processor Interface (OpenCAPI) is a high-speed cache coherent processor expansion bus standard, for example, used in large data center computers. Open CAPI offers low latency, high speed, direct memory access connectivity between devices of different instruction set architectures. While the discussion below primarily references CXL, embodiments of the present disclosure can be used with other cache coherent memory protocol standards, and are not limited to the example CXL attached memory.

Methods of disclosed embodiments enable dynamically configuring the heatmaps and access frequency counters comprising the heatmaps. Methods of disclosed embodiments advantageously are applied to both memory tiering (moving data) as well as memory caching (maintaining a copy of data). Heatmaps of disclosed embodiments allow enhanced decisions around memory remapping (moving the location of data in memory).

That is, where and which type of memory should a memory region (e.g., cache line, page or application set of pages) be mapped and the granularity depends on the context of the memory remapping (e.g., VM guest memory pages, application pages, cache lines in a cache controller). Generally, the coolest memory regions (lowest frequencies) are selected to be remapped to slower/higher-capacity memory; while frequently accessed (highest frequencies) would be selected to be remapped to faster memory.

The memory controller limits a maximum counter value, avoiding counter overflow to maintain effective counter information for the heatmaps of disclosed embodiments. The memory controller can implement various algorithms to increment the corresponding heatmap counters, such as by using a selected "heating" function and strategy for mapping time and events to heatmap counter increments. The memory controller can also limit the maximum counter value using a selected "cooling function" and strategy for scheduling and decrementing the heatmap counters. The memory controller can maintain a set of frequency counters for each region, such as a set of two frequency counters (read and write) or a single counter representing all combined memory access operations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
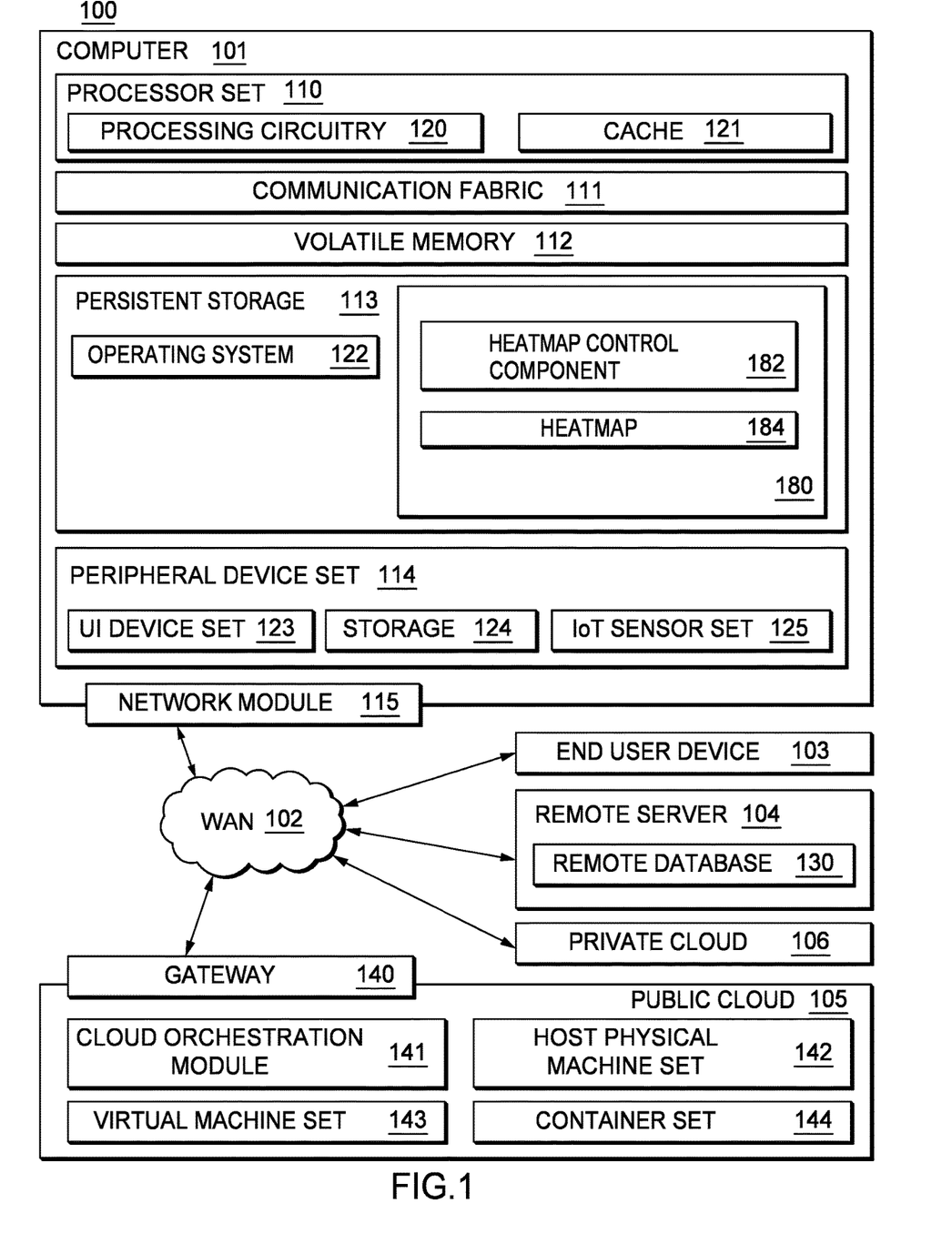
FIG. 1 is a block diagram of an example computer environment for use in conjunction with one or more disclosed embodiments for optimizing data placement in a cache hierarchy.

Referring to FIG. 1, a computing environment 100 contains an example of an environment for the execution of at least some of the computer code involved in performing the inventive methods, such as Heatmap Control Component 182 for Memory Remapping and a Heatmap 184 at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure provide an enhanced system and methods for memory management including optimizing data placement in a memory hierarchy. Features of disclosed embodiment allow enhanced management of memory in the context of a memory hierarchy comprising heterogeneous memories that have different performance characteristics. A non-limiting computer implemented method can optimize data placement in a memory hierarchy by collecting data access frequencies to memory in the form of a heatmap. The term heatmap as used herein represents a frequency count of accesses to quantized memory. One feature of one or more disclosed embodiments is to realize the functionality for heatmap capture as a function of memory controller hardware.

Figure 2:
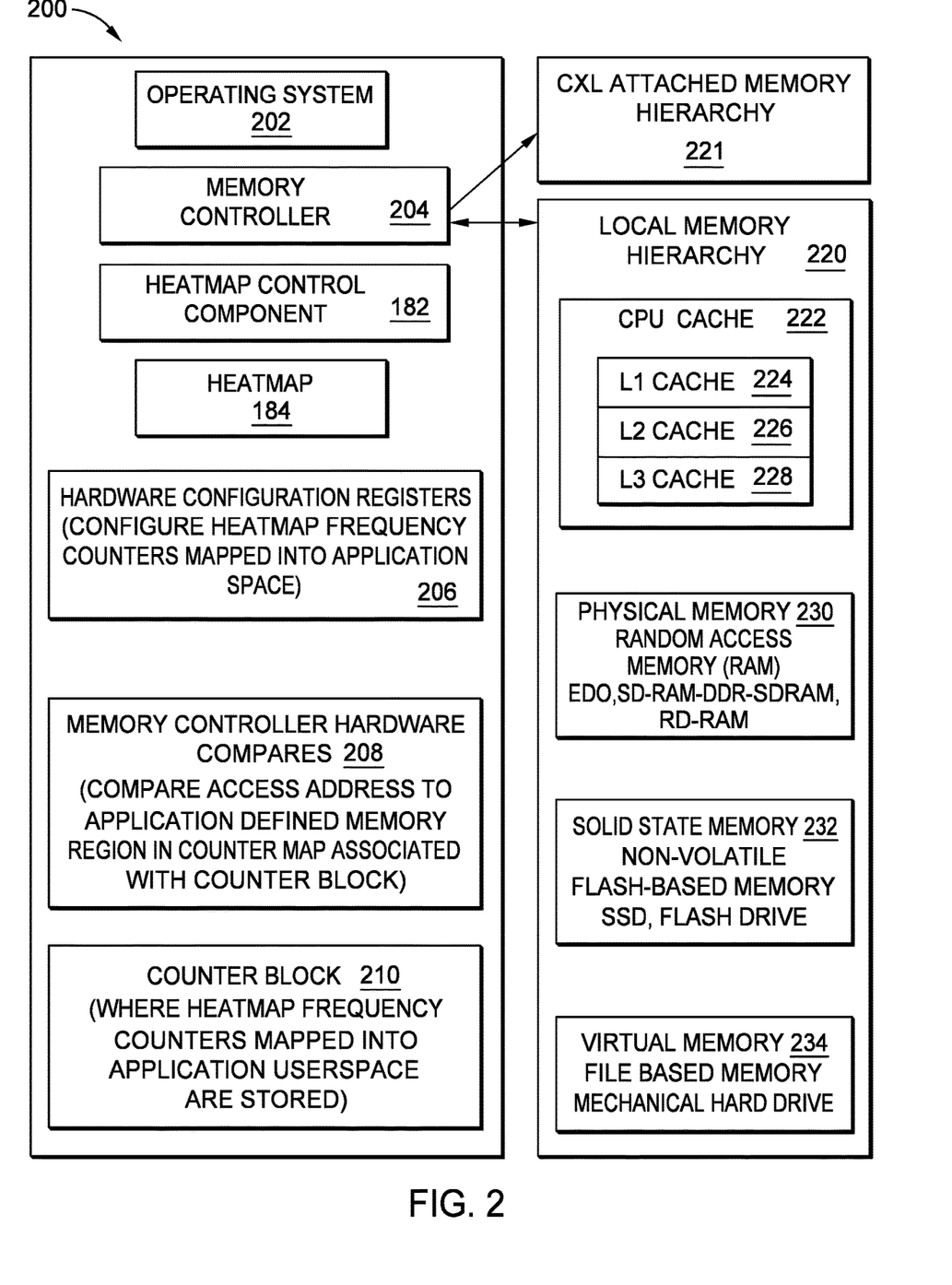
FIG. 2 is a block diagram of an example system for optimizing data placement in a memory hierarchy of one or more disclosed embodiments.

FIG. 2 illustrates an example system 200 for optimizing data placement in a memory hierarchy of one or more disclosed embodiments. System 200 can be used in conjunction with the computer 101 and cloud environment of the computing environment 100 of FIG. 1 for optimizing data placement in a memory hierarchy, such as an example memory hierarchy 220; including Compute eXpress Link (CXL) attached memory hierarchy 221 to provide enhanced memory management. System 200 provides enhanced memory management to decide how to map local and remote (e.g., CXL attached) memories to an application or VM address space, for both memory tiering data movement and memory caching to maintain a data copy.

System 200 includes an Operating System 202, a Memory Controller 204, and Hardware Configuration Registers 206 to configure frequency counters mapped into application space, and Hardware Compares 208 for comparing access address (i.e., memory physical address) with masks maintained in an application-defined region of memory known as the counter map. System 200 includes a Counter Block 210, associated with a counter map, where heatmap counters are stored, such as frequency counters mapped into application user-space. System 200 includes a Heatmap Control Component 182, used for memory management optimization and heatmap features, such as Memory Remapping, and a Heatmap 184 for optimizing data placement in a memory hierarchy. System 200 can use the Heatmap Control Component 182 and the Heatmap 184 together with the Operating System 202, Memory Controller 202, Hardware Configuration Registers 206, Hardware Compares 208, and Counter block 210 for optimizing data placement in the memory hierarchy 220.

The example local memory hierarchy 220 includes at the upper memory level, a central processor unit (CPU) cache 222, which can include an L1 cache 224, an L2 cache 226, and an L3 cache 228, as shown. The memory hierarchy 220 includes a next memory level of a main memory or physical memory 230, which includes for example, a hierarchy of one or more of Random Access Memory (RAM), RAM, SD-RAM, DDR-SDRAM, and RD-RAM. The memory hierarchy 220 includes a next level Solid State drive (SSD) memory 232 or non-volatile Flash-based memory, such as SSD, Flash Drive, NAND Flash SSD, and tape. The memory hierarchy 220 includes a lowest memory level or virtual memory 234 or file-based memory, such as a mechanical hard disk drive (HDD).

CXL attached memory hierarchy 221 can comprise another memory hierarchy in addition to the local memory hierarchy 220. In one embodiment, the CXL attached memory hierarchy 221 comprises heterogeneous memories that have different performance characteristics. The attached CXL memory hierarchy 221 implements a standard for connecting machines and devices with a cache-coherent memory sharing protocol. In computer architecture, cache coherence is the uniformity of shared resource data that can be stored in multiple local caches. The memory hierarchy 220 can be considered to comprise CXL attached memory hierarchy 221, such as on multi-server (node) sharing of memory and accelerator resources. The CXL standard enables attaching programmable devices to system 200 and allows adding functions to the main memory load-store path. For example, evictions from the last level cache can create CXL write operations that can be handled by a (CXL Type 3) intelligent memory controller 204. For example, the CXL standard enables building custom functions into memory controllers such as memory controller 204 used to add CXL attached memory hierarchy 221 to the memory load-store path of disclosed embodiments.

System 200 enables effective memory management for memory hierarchies 220, 221 comprising heterogeneous memories that have different performance envelopes. For example, the memory management of disclosed embodiments advantageously can be used with an algorithm that decides how to map local and remote (e.g., CXL attached) memories to an application or VM address space. The disclosed memory management features can be used for scenarios where use of or access to memory is not visible to a given memory management algorithm. The enhanced memory management of disclosed embodiments can include both memory tiering or moving data as well as memory caching or maintaining a copy of data.

Figure 3:
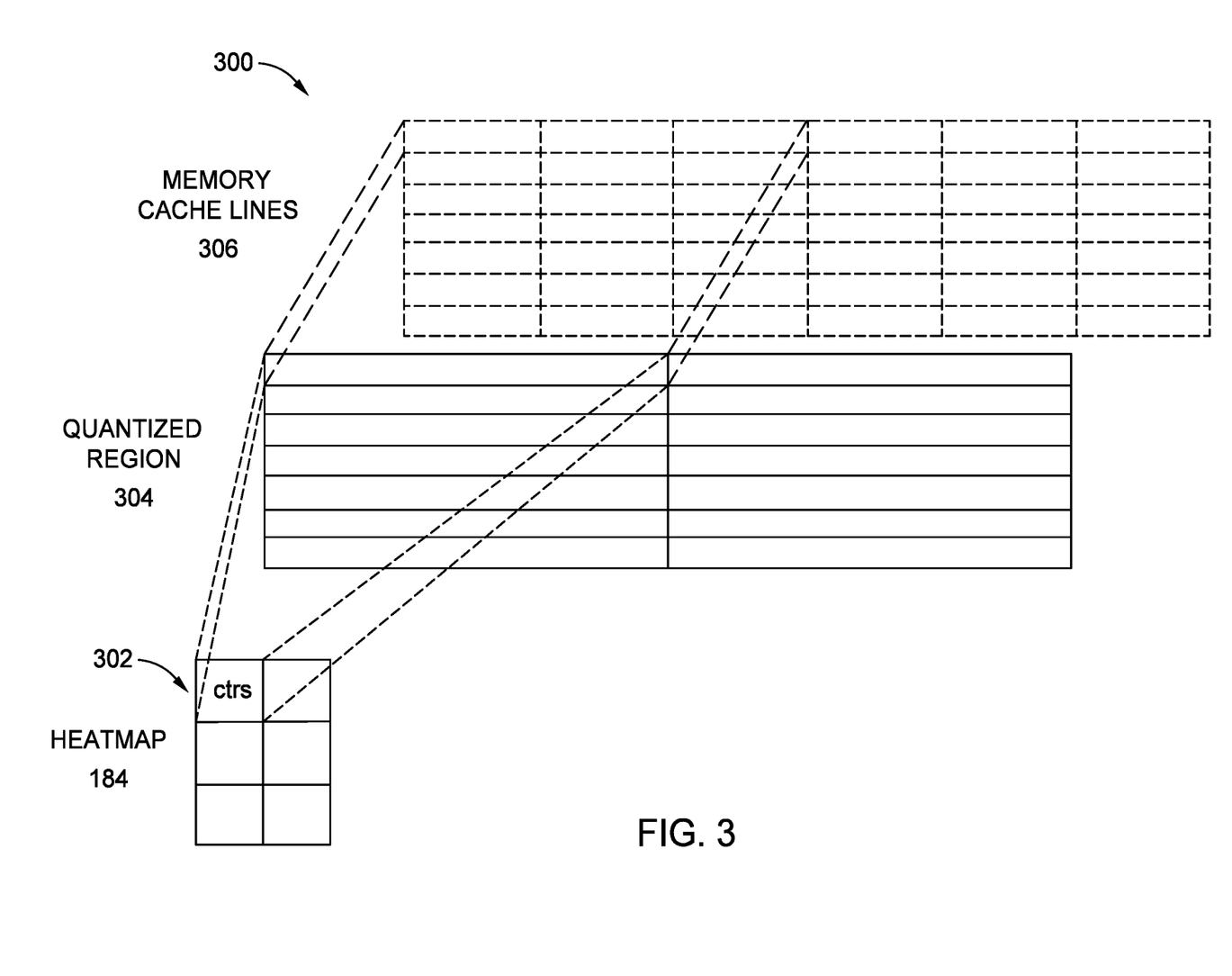
FIG. 3 illustrates an example logical heatmap view used for optimizing data placement in a memory hierarchy of one or more disclosed embodiments.

FIG. 3 illustrates an example logical heatmap architecture 300 for optimizing data placement, such as in the memory hierarchy 220 of one or more disclosed embodiments. A heatmap 184 represents a frequency count of accesses to memory and the different regions of memory that have been accessed. In one embodiment, the heatmap 184 utilizes a plurality of access frequency counters 302 integrated into the Memory Controller 204. The access frequency counters 302 correspond to a region of memory according to a bitmask or counter map. The counter map and the heatmap access frequency counters 302 are software defined and are accessible in the reserved portion of memory.

Figure 5A:
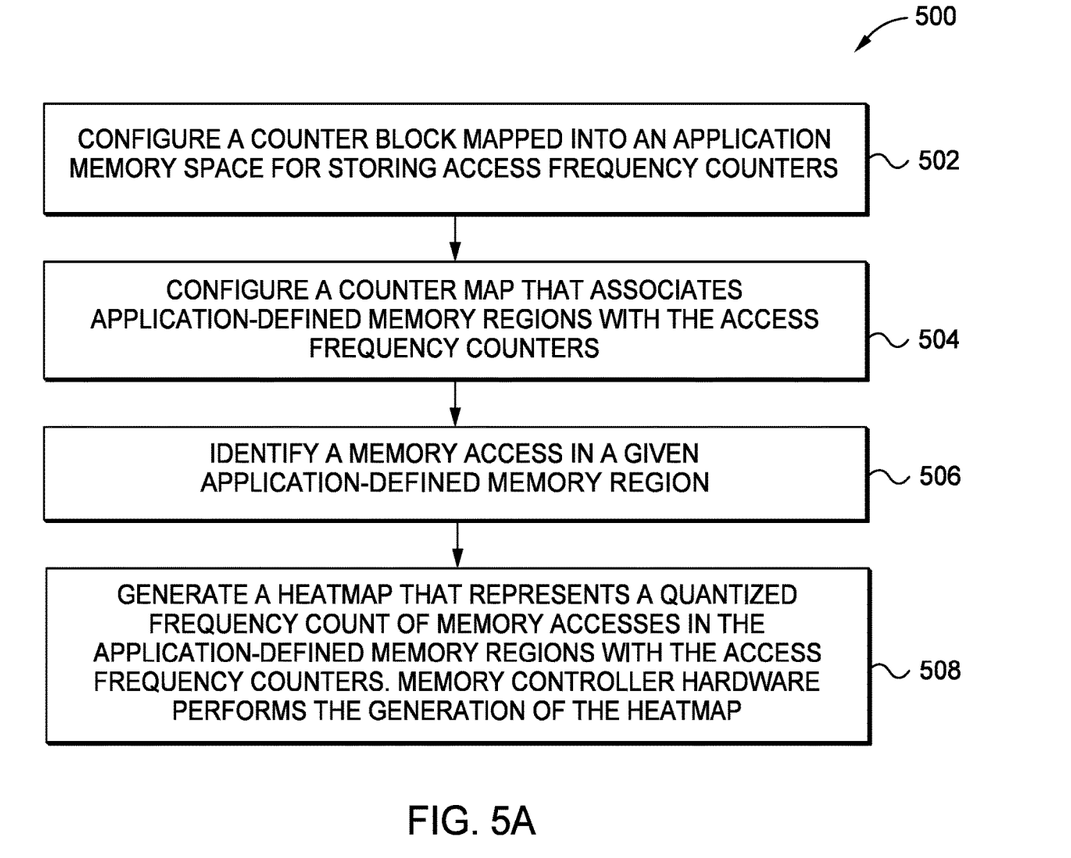
FIG. 5A illustrates further example operations of a method for optimizing data placement in a memory hierarchy of disclosed embodiments.
Figure 5B:
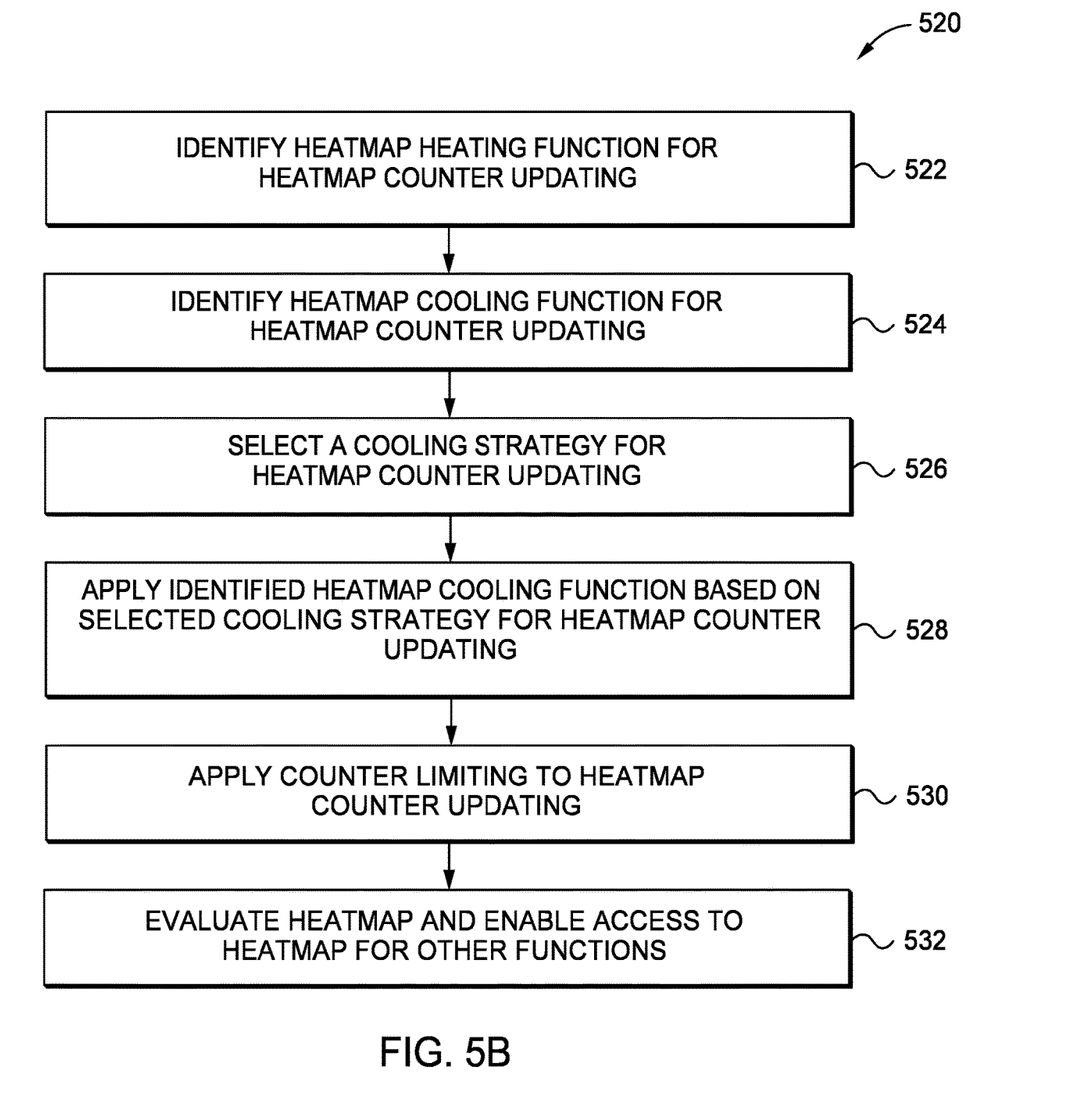
FIG. 5B illustrates further example operations of a method for counter limiting and memory evaluation of disclosed embodiments.
Figure 6:
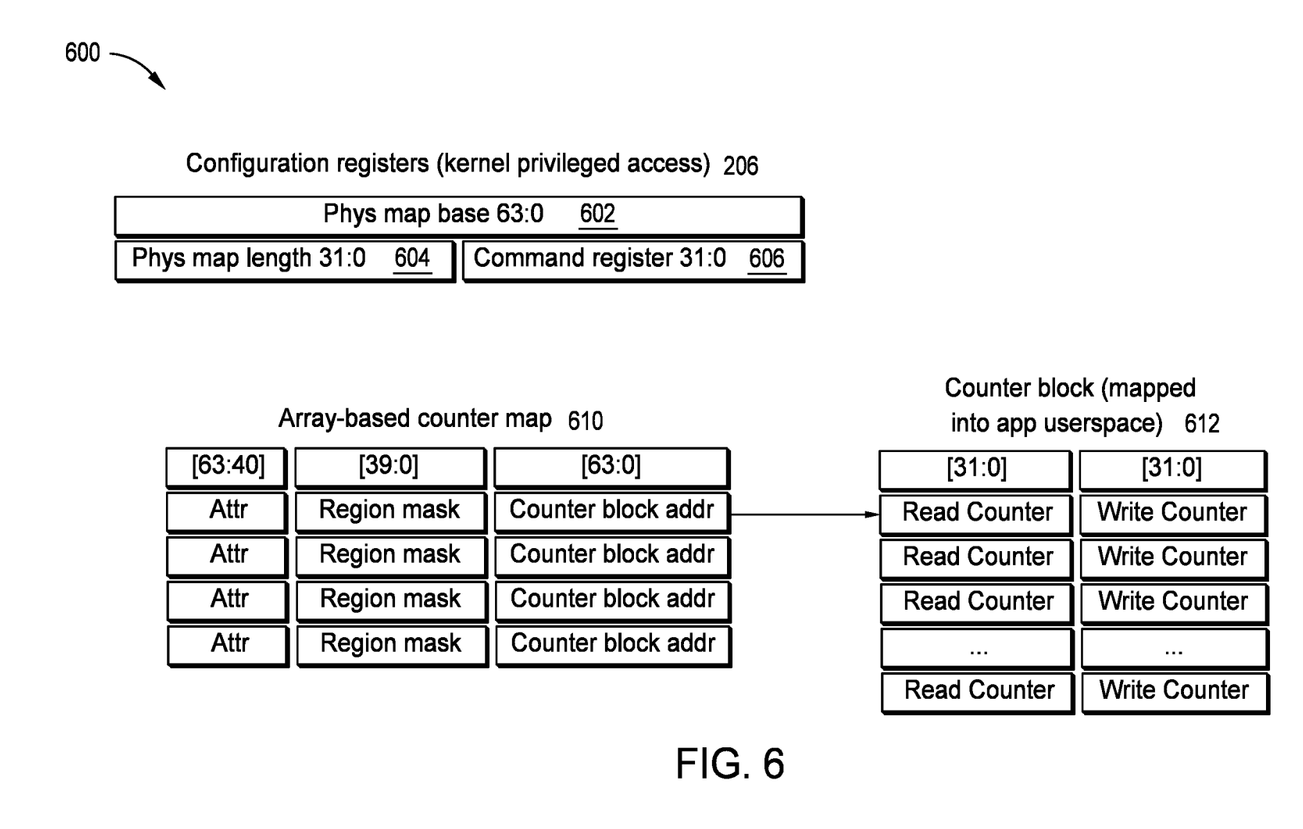
FIG. 6 illustrates an example array based counter map implementation used for optimizing data placement in a memory hierarchy of one or more disclosed embodiments.

As shown, heatmap 184 includes access frequency counters 302 mapped to a memory region 304 for a group of memory cache lines 306 as indicated by dashed lines. For example, the access frequency counters 302 can include multiple separate counters for read and write memory accesses, or a single counter for counting combined read and write memory accesses. Memory cache lines 306 are logically grouped into respective regions 304. This grouping can be performed using a bitmask on the memory address space and used with frequency counter maps and counter blocks such as illustrated in FIGS. 5 and 6 to maintain the heatmap 184. For example, (using 32 bit for brevity), a mask of 0xFFFFF000 can group byte-addressable memory cache lines 306 into 4 KB pages.

Memory controller 204 maintains a set of frequency counters 302 for each region 304, such as a set of 1, 2 or more counters. For example, frequency counters 302 can have a counter set of size two (read and write), while other counters could be added (e.g., temporal write) or a single counter representing all memory operations could be used. Furthermore, duplicate counters corresponding to the same memory region may support two algorithms for counter manipulation.

In one or more disclosed embodiments, the operations of the Memory Controller 204 enables enhanced management of memory in the context of heterogeneous memories that have different performance envelopes, such as illustrated in FIG. 2. In embodiments of the disclosure, Memory Controller 204 collects the heatmap information that can be accessed by or provided to multiple different algorithms, (e.g., algorithms that are implemented by Operating System 202) for purposes other than memory management. The heatmap 184 maintained by Memory Controller 204 can provide heatmap information used to identify normal and abnormal data access patterns for cyber-security and ransomware detection. The heatmap 184 maintained by Memory Controller 204 can provide the heatmap information to identify an abnormal data structure, such as data structure anomalies differing from a typical data structure and other data performance anomalies.

Figure 4:
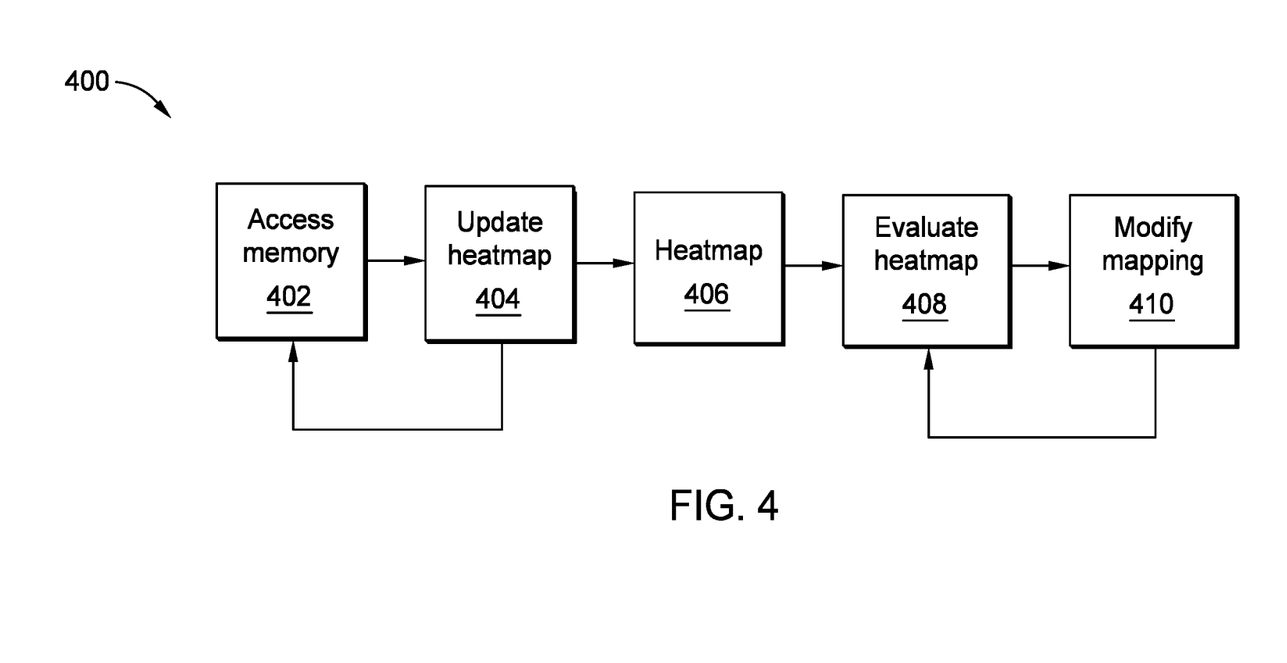
FIG. 4 is a flow chart illustrating example operations for optimizing data placement in a memory hierarchy of one or more disclosed embodiments.

FIG. 4 illustrates an example method 400 for optimizing data placement such as in the memory hierarchy 220 of one or more disclosed embodiments. At block 402, Memory Controller 204 identifies a memory access, collects the heatmap information for example using an array based counter map implementation 600 or a directory based counter map implementation 700 as respectively illustrated in FIGS. 6 and 7.

At block 404, Memory Controller 204 updates the heatmap 184 by updating one or more frequency counters 302 for the memory access. In one embodiment, the updated heatmap at block 406 represents a frequency count of accesses to memory of frequency counters 302, providing the updated heatmap. At block 408, Memory Controller 204 evaluates the heatmap, identifying access frequencies of access frequency counters 302 mapped to a given memory region 304 for a group of memory cache lines 306, as shown in FIG. 3. At block 410, Memory Controller 204 enables modified memory mapping of disclosed embodiments using the heatmap 184, such as identifying access frequencies of the heatmap 184 to determine eviction and data movement in the memory hierarchy 220 and 221.

Memory controller 204 applies a selected heating function to update the heatmap 184 at block 404. In one disclosed embodiment at block 404, a basic heating function is represented by f(x) is x=x+1. For example, the heating function f(x) is x=x+1 can be applied to increment the count x of a specific heatmap frequency counter 302 by one for an associated memory access. Various alternative strategies can be applied to add a heat value to the heatmap 184 through a different selected heating function. For example, the one different heating function may to increment the counter by multiple counts according to time for an associated memory access or by another non-linear counter update. The heatmap evaluation function at block 408 can also use different weighted values to sum differently weighted counters 302. Further, different types of counters 302 (e.g., read and write) can adopt different heating functions.

FIG. 5A illustrates further example operations of a method 500 for optimizing data placement in a memory hierarchy of disclosed embodiments. As indicated at block 502, Memory Controller 204 configures a counter block mapped into an application memory space for storing access frequency counters 302. As illustrated in FIG. 3, the heatmap 184 comprises a plurality of access frequency counters 302. Each of the access frequency counters 302 are mapped to a given memory region 304 including a group of memory cache lines 306.

At block 504, Memory Controller 204 configures a counter map that associates application-defined memory regions 304 with the access frequency counters 302. At block 506, Memory Controller 204 identifies a memory access in a given application-defined memory region 304. At block 508, Memory Controller 204 generates the heatmap 184 that represents a frequency count of access to the application-defined memory regions 304 with the access frequency counters 302. Example configuration and operations for generating and updating the heatmap 184 are described above and illustrated in FIGS. 3 and 4.

FIG. 5B illustrates further example operations of a method 520 for counter limiting and memory remapping evaluation of disclosed embodiments. As indicated at block 522, Memory Controller 204 identifies a heatmap heating function for heatmap counter updating. For example, the heating function f(x) is x=x+1 can be applied to implement heatmap counter updating.

As indicated at block 524, Memory Controller 204 can identify a cooling function for updating the frequency counters of the heatmap. For example, multiple cooling functions can be defined. Cooling functions can be triggered by time (i.e., periodically) or an event where a counter reaches some limit (e.g., maximum value of underlying integer representation). Example embodiments of cooling functions can include:

$$g(x) = 0$$

$g(x) = x >> 1$ where, the counter value is significantly larger than one;

$g(x) = x - A$, where $A$ represents a defined configurable cooling value;

$g(x) = x - \min$, where min represents a defined minimum value of all non-zero counters.

As indicated at block 526, Memory Controller 204 identifies a selected cooling strategy to be applied for the identified cooling function to update the frequency counters 302 of the heatmap 184. Example cooling strategies that could be applied include, apply g(x) every n seconds, or apply g(x) when the limit of two or more counters occurs. Another selected cooling strategy could be applied for the identified cooling function for example apply g(x) when a re-mapping event occurs (e.g., a page is evicted from cache), such as at block 410 in FIG. 4. For example, multiple heating and cooling strategies that can be dynamically chosen based on a given application.

As indicated at block 528, Memory Controller 204 applies the identified heatmap cooling function based on the selected cooling strategy for updating the frequency counters of the heatmap. Each cooling function has a related cost in terms of computing resources and latency overheads. The above list arranges the example cooling functions approximately in an order of increasing costs for the cooling functions.

As indicated at block 530, Memory Controller 204 applies count limiting for updating the frequency counters of the heatmap. The frequency counters are of a limited range (i.e., 2^n where n is number of available bits). If counters are left to increment continuously, the frequency counters will eventually wrap around, leaving an inaccurate heatmap representation. For example, at block 530, Memory Controller 204 applies counter limiting so that once any of the frequency counters reaches its limit, incrementing the frequency counter stops.

As indicated at block 532 Memory Controller 204 evaluates the heatmap 184 and enables access to the heatmap 184 for other functions, such as enabling access for heatmap evaluation to identify normal and abnormal data access patterns for the purpose of security and threat detection. Multiple different uses of the heatmap 184 are enabled beyond evaluating the heatmap to make decisions about memory remapping (i.e., as described with respect to block 408 in FIG. 4). For example, the heatmap 184 can be used for program and algorithm optimization, (i.e., using memory access information to identify data structure anomalies.) Further, the heat map 184 can be used for example, with a program-scheduling algorithm for memory access, (e.g., in a multi-tenant system, that co-locates workloads (e.g., VM); memory access frequency can be made part of the scheduling policy.) For example, such program scheduling of memory access can prevent memory resource starvation by co-located tenants by using heat map 184.

Figure 7:
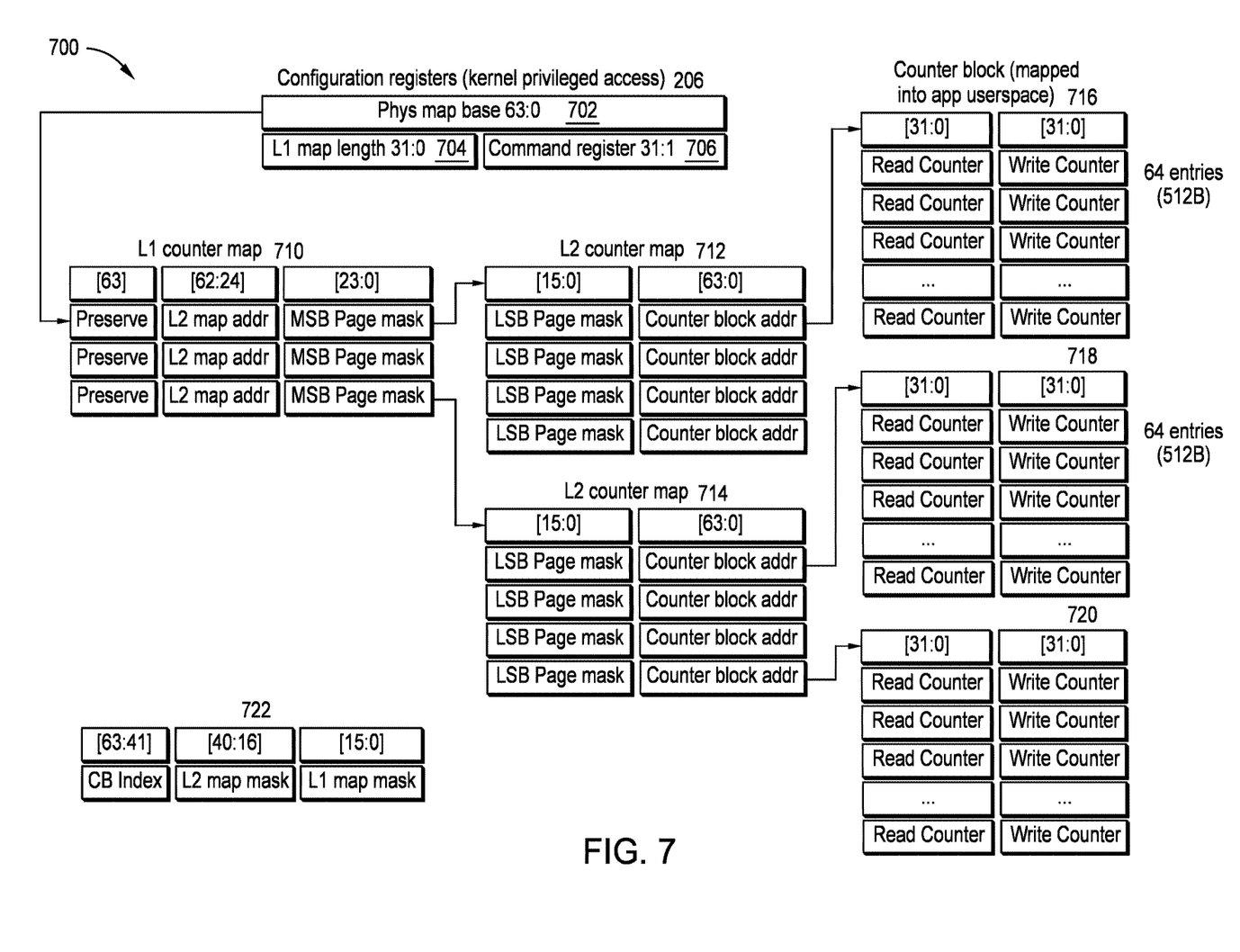
FIG. 7 illustrates an example directory-based counter map implementation used for optimizing data placement in a memory hierarchy of one or more disclosed embodiments.

FIGS. 6 and 7 respectively illustrate example implementations 600 and 700 that can be implemented in hardware used for optimizing data placement in a given memory hierarchy of one or more disclosed embodiments. For example, 2MiB can be provided for tracking 32K cache lines (CLs), (e.g., where one MiB (MebiByte) is equal to $2^{20}$ or 1,048,576 bytes, where a MB (MegaByte) is equal to $10^6$ or 1,000,000 bytes). The size of the counter map determines the number of 4KiB pages that can be tracked (i.e., access frequency count of heatmap 184 is collected for the corresponding page). For example, 32K cache lines can be provided with a granularity per CL to provide 16 bits per counter, two (2) access frequency counters 302 (read and write) equals 4×32 K or 128KiB with 6% overhead.

FIG. 6 illustrates an example an array based counter map implementation 600 of one or more disclosed embodiments. The array based counter map implementation 600 includes example hardware configuration registers (privileged access only) 206 that are used to configure heatmap frequency counters 302 that are mapped into application space (by the Operating System 202). The illustrated hardware configuration registers 206 include a physical (Phys) map base 602 (63:0) and further includes Phys map length 604 (31:0) and a command register 606 (31:0).

The array based counter map implementation 600 includes an array-based counter map 610 and a counter block 612 mapped into an application user space. Memory controller hardware compares 208 can compare access address (e.g., CXL physical address) with masks that are maintained in an application-defined region of memory comprising the array-based counter map 610. The array-based counter map 610 comprises entries of attribute (63:40), region mask (39:0), and counter block address (63:0). For example, the attribute (63:40) defines different counter arrangements, such as the size of counters 302, a read/write split, and error conditions, such as counter overflow. A zero entry indicates a given region mask (39:0) is inactive. The counter block 612 is mapped into an application user space, comprises read counters (31:0) and write counters (31:0), for example including 64 entries (512B) in one disclosed example array based counter map implementation 600, as shown.

The size of the counter map 610 determines the number of 4KiB pages that can be tracked (i.e., where heatmap 184 is collected for the corresponding page). Each entry in the counter map 610 associates with the counter block 612 where the read and write counters 302 are stored. If a page mask hits a given CXL access address (63:0) in counter map 610, then the counter block address is de-referenced, and the appropriate counter 302 (read or write counter) is incremented in counter block 612. Alternatively, array based counter map implementation 600 can include a given arrangement for the counter block 612 that stores only one counter 302, for example which is incremented for both read and write accesses.

FIG. 7 illustrates an example directory-based counter map implementation 700 of one or more disclosed embodiments. The directory-based counter map implementation 700 similarly includes the hardware registers (privileged access only) 206 that are used to define associated frequency counters of respective counter blocks 716, 718, and 720 that are mapped into application space (by the operating system 202). The illustrated hardware configuration registers 206 include a physical (Phys) map base 702 (63:0) such as comprising L1 map length 704 (31:0) and a command register 706 (31:0). The directory-based counter map implementation 700 includes an L1 counter map 710, a first L2 counter map 712 and a second L2 counter map 714, and the multiple counter blocks 716, 718, and 720. L1 counter map 710 comprises entries Present (63), L2 map address (62:24) and MSB Page mask (23:0). Both the first L2 counter map 712 and the second L2 counter map 714 comprise entries LSB Page mask (15:0) and counter block address (63:0). Each of the counter blocks 716, 718, and 720 are mapped into application space, comprise read counters (31:0), and write counters (31:0). The directory-based counter map implementation 700 includes a final counter-block index 722 comprising entries CB index (63:41), L2 map mask (40:16), and L1 map mask (15:0). A memory access address is broken up into the L1 and L2 map masks, and the final counter-block index. The L1 mask MSB is taken, and the map is scanned for a matching mask. The L2 map address in the L1 counter map 710 is used to find the associated L2 counter map 712, 714. The L2 page mask LSB in the L2 counter map 712 is used to match the entry in L2 counter map 712, 714. The Final CB index 722 is used to index into the associated counter block 716, 718 or 720.

The illustrated array based counter map implementation 600 in FIG. 6 and the directory-based counter map implementation 700 including the example register bit sizes are provided for illustrative purposes and various other implementations are possible for integrating the access frequency counters 302 of the heatmap 184 into the memory controller 202.

While the foregoing is directed to embodiments of the present invention, other and further embodiments of the invention may be devised without departing from the basic scope thereof, and the scope thereof is determined by the claims that follow.

What is claimed is:

1. A method comprising:
    configuring a counter block mapped into an application memory space, the counter block comprises a plurality of access frequency counters;
    configuring a counter map, wherein the counter map associates application-defined memory regions with one or more of the access frequency counters;
    identifying a memory access in a given application-defined memory region;
    identifying at least one access frequency counter for the given application-defined memory region based on the counter map;
    identifying a heating function to update a frequency count of the at least one access frequency counter for the memory access, wherein the heating function controls how the frequency count is updated;
    generating a heatmap using the frequency count of the at least one access frequency counter of memory accesses to the application-defined memory region, wherein generating the heatmap is performed by memory controller hardware; and
    accessing the heatmap to identify abnormal data access patterns in the application-defined memory region.

2. The method of claim 1, wherein generating the heatmap further comprises maintaining one or more of the access frequency counters for each application-defined memory region.

3. The method of claim 1, wherein generating the heatmap further comprises implementing a selected different count value for incrementing respective read access frequency counters and write access frequency counters.

4. The method of claim 1, wherein generating the heatmap further comprises performing count limiting at a set count limit value, wherein incrementing the access frequency counter stops at the set count limit value.

5. The method of claim 1, wherein generating the heatmap further comprises implementing a selected cooling function to limit a frequency count of a given access frequency counter below a set count value.

6. The method of claim 1, wherein generating the heatmap further comprises implementing a selected cooling function to limit the frequency count of the access frequency counters at a set time interval.

7. The method of claim 1, wherein generating the heatmap further comprises implementing a selected cooling function to limit the frequency count of the access frequency counters when two or more access frequency counters reach a set count limit value.

8. The method of claim 1, generating the heatmap further comprises evaluating the heatmap for optimizing data placement in a memory hierarchy.

9. The method of claim 1, wherein generating the heatmap further comprises comparing an access address in a given application-defined memory region with a selected one of an array-based counter map and a directory-based counter map to track the memory access.

10. The method of claim 1, wherein configuring the counter block mapped into the application memory space comprises configuring the counter map mapped into a selected one of local memory space and a remote memory space.

11. A system, comprising:
    a processor; and
    a memory, wherein the memory includes a computer program product configured to perform operations for optimizing data placement in a memory hierarchy, the operations comprising:
    configuring a counter block mapped into an application memory space, the counter block comprises a plurality of access frequency counters;
    configuring a counter map, wherein the counter map associates application-defined memory regions with one or more of the access frequency counters;
    identifying a memory access in a given application-defined memory region;
    identifying at least one access frequency counter for the given application-defined memory region based on the counter map;
    identifying a heating function to update a frequency count of the at least one access frequency counter for the memory access, wherein the heating function controls how the frequency count is updated;
    generating a heatmap using the frequency count of the at least one access frequency counter of memory accesses to the application-defined memory region, wherein generating the heatmap is performed by memory controller hardware; and accessing the heatmap to identify abnormal data access patterns in the application-defined memory region.

12. The system of claim 11, wherein generating the heatmap further comprises maintaining one or more of the access frequency counters for each application-defined memory region.

13. The system of claim 11, wherein generating the heatmap further comprises implementing a selected different count value for incrementing respective read access frequency counters and write access frequency counters.

14. The system of claim 11, wherein generating the heatmap further comprises performing count limiting at a set count limit value, wherein incrementing the access frequency counter stops at the set count limit value.

15. The system of claim 11, wherein generating the heatmap further comprises implementing a selected cooling function to limit the frequency count of the access frequency counters at a set time interval.

16. A computer program product for optimizing data placement in a memory hierarchy, the computer program product comprising:

a computer-readable storage medium having computer-readable program code embodied therewith, the computer-readable program code executable by one or more computer processors to perform an operation comprising:

configuring a counter block mapped into an application memory space, the counter block comprises a plurality of access frequency counters;

configuring a counter map, wherein the counter map associates application-defined memory regions with one or more of the access frequency counters;

identifying a memory access in a given application-defined memory region;

identifying at least one access frequency counter for the given application-defined memory region based on the counter map;

identifying a heating function to update a frequency count of the at least one access frequency counter for the memory access, wherein the heating function controls how the frequency count is updated;

generating a heatmap using the frequency count of the at least one access frequency counter of memory accesses to the application-defined memory region, wherein generating the heatmap is performed by memory controller hardware; and accessing the heatmap to identify abnormal data access patterns in the application-defined memory region.

17. The computer program product of claim 16, wherein generating the heatmap further comprises maintaining one or more of the access frequency counters for each application-defined memory region.

18. The computer program product of claim 16, wherein generating the heatmap further comprises implementing a selected different count value for incrementing respective read access frequency counters and write access frequency counters.

19. The computer program product of claim 16, wherein generating the heatmap further comprises performing count limiting at a set count limit value, wherein incrementing the access frequency counter stops at the set count limit value.

20. The computer program product of claim 16, wherein generating the heatmap further comprises implementing a selected cooling function to limit the frequency count of the access frequency counters at a set time interval.

* * * * *